US011620441B1

(12) United States Patent
Schafer et al.

(10) Patent No.: US 11,620,441 B1
(45) Date of Patent: Apr. 4, 2023

(54) SYSTEM, METHOD, AND COMPUTER PROGRAM PRODUCT FOR INSERTING CITATIONS INTO A TEXTUAL DOCUMENT

(71) Applicant: Clearbrief, Inc., Seattle, WA (US)

(72) Inventors: Jacqueline Grace Schafer, Seattle, WA (US); Jose Demetrio Saura, Seattle, WA (US); Tovi Jordan Newman, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 17/873,508

(22) Filed: Jul. 26, 2022

Related U.S. Application Data

(60) Provisional application No. 63/314,627, filed on Feb. 28, 2022.

(51) Int. Cl.
*G06F 17/00* (2019.01)
*G06F 40/166* (2020.01)
*G06F 40/30* (2020.01)
*G06F 3/0482* (2013.01)

(52) U.S. Cl.
CPC .......... *G06F 40/166* (2020.01); *G06F 3/0482* (2013.01); *G06F 40/30* (2020.01)

(58) Field of Classification Search
CPC ....... G06F 40/166; G06F 40/30; G06F 3/0482
See application file for complete search history.

(56) References Cited

U.S. PATENT DOCUMENTS

| 6,389,436 B1 * | 5/2002 | Chakrabarti | G06F 16/355 707/E17.097 |
| 7,028,259 B1 * | 4/2006 | Jacobson | G06F 40/253 715/236 |
| 7,529,756 B1 * | 5/2009 | Haschart | G06F 16/93 |

(Continued)

FOREIGN PATENT DOCUMENTS

| CN | 101031915 A | 9/2007 |
| CN | 105488151 A | 4/2016 |

OTHER PUBLICATIONS

Huang, Zihan, et al, "Context-Aware Legal Citation Recommendation Using Deep Learning", Proceedings of the ICAIL 2021, DOI: 10.1145/3462757.3466066, pp. 1-10, Jun. 20, 2021 (Year: 2021).*

(Continued)

*Primary Examiner* — Laurie A Ries
(74) *Attorney, Agent, or Firm* — The Webb Law Firm

(57) ABSTRACT

Provided are systems, methods, and computer program products for inserting citations into a textual document. The method includes receiving a first user input identifying a portion of a textual document, generating a plurality of predicted citations based on comparing at least one string in the textual document associated with the portion of the textual document to at least a subset of source documents of a plurality of source documents with a model selected from a plurality of models based on the at least one string, each predicted citation of the plurality of predicted citations corresponding to at least one source document of the plurality of source documents, displaying, on a graphical user (Continued)

interface, the plurality of predicted citations, and inserting a predicted citation of the plurality of predicted citations into the portion of the textual document based on a second user input.

29 Claims, 6 Drawing Sheets

(56) References Cited

U.S. PATENT DOCUMENTS

| | | | | |
|---|---|---|---|---|
| 9,176,938 | B1* | 11/2015 | Kerschen | G06F 16/93 |
| 9,218,344 | B2* | 12/2015 | Al-Kofahi | G06F 16/00 |
| 10,796,391 | B2* | 10/2020 | Grom | G06Q 10/06375 |
| 11,074,400 | B2* | 7/2021 | Tian | G06F 40/103 |
| 11,194,963 | B1 | 12/2021 | Schafer et al. | |
| 2003/0196176 | A1* | 10/2003 | Abu-Ghazalah | G06F 40/166 715/256 |
| 2011/0060761 | A1* | 3/2011 | Fouts | G06F 40/10 707/E17.071 |
| 2011/0107194 | A1 | 5/2011 | Cui | |
| 2014/0006424 | A1* | 1/2014 | Al-Kofahi | G06F 40/169 707/754 |
| 2016/0344828 | A1* | 11/2016 | Häusler | G06F 16/9535 |
| 2017/0263248 | A1* | 9/2017 | Gruber | G10L 15/02 |
| 2017/0308985 | A1* | 10/2017 | Grom | G06F 16/3331 |
| 2017/0344531 | A1* | 11/2017 | Neumann | G06F 40/274 |
| 2018/0276305 | A1* | 9/2018 | Liu | G06V 10/761 |
| 2019/0079979 | A1* | 3/2019 | Chan | G06Q 50/18 |
| 2019/0377785 | A1* | 12/2019 | N | G06F 40/20 |
| 2020/0193153 | A1* | 6/2020 | Lee | G06V 30/418 |
| 2020/0342523 | A1* | 10/2020 | Shah | G06F 16/9566 |
| 2020/0349181 | A1* | 11/2020 | Carbune | H04L 51/02 |
| 2021/0097095 | A1* | 4/2021 | Peavler | G06F 40/279 |
| 2021/0149980 | A1* | 5/2021 | Pavlini | G06F 16/93 |
| 2021/0390488 | A1* | 12/2021 | Demchalk | G06F 16/345 |
| 2022/0019609 | A1* | 1/2022 | Quartey | G06F 16/383 |
| 2022/0198142 | A1* | 6/2022 | Funatsu | G06F 3/0482 |
| 2022/0245959 | A1* | 8/2022 | Lee | G06V 30/414 |
| 2022/0284530 | A1* | 9/2022 | Bucciarelli | H04W 4/14 |
| 2022/0284987 | A1* | 9/2022 | Akiyama | C07K 7/08 |
| 2022/0414317 | A1* | 12/2022 | Heyns | G06F 40/117 |

OTHER PUBLICATIONS

Zhang, Paul, et al, "Semantics-Based Legal Citation Network", Proceedings of the ICAIL '07, pp. 123-130, 2007 (Year: 2007).*

Huang, Zihan, et al, "Context-Aware Legal Citation Recommendation Using Deep Learning", DOI: 10.1145/3462757.3466066, Jun. 20, 2021, published in Proceedings of ICAIL 2021, pp. 1-10. (Year: 2021).*

* cited by examiner

SYSTEM, METHOD, AND COMPUTER PROGRAM PRODUCT FOR INSERTING CITATIONS INTO A TEXTUAL DOCUMENT

CROSS REFERENCE TO RELATED APPLICATION

This application claims priority to U.S. Provisional Patent Application No. 63/314,627 filed Feb. 28, 2022, the disclosure of which is incorporated by reference in its entirety.

BACKGROUND

1. Field

This disclosure relates generally to document processing and, in non-limiting embodiments or aspects, systems, methods, and computer program products for inserting citations into a textual document.

2. Technical Considerations

When drafting a document, such as a legal brief, it is common for authors to omit citations to sources, particularly factual sources, to avoid disrupting their writing. In some examples, a user may note the need for a citation but will plan to add it at a later time, after the brief is drafted or the like. For example, an author may type an assertion that they recall is supported by a factual document, such as a deposition transcript, but may not recall which document includes the support.

Existing word processing applications operate independently of source documents that correspond to assertions in a textual document being authored within the word processing application. As a result, authors must operate several additional software applications and/or computing devices to locate and cite to source documents.

SUMMARY

According to non-limiting embodiments or aspects, provided is a computer-implemented method comprising: receiving, with at least one processor, a first user input identifying a portion of a textual document; generating, with at least one processor, a plurality of predicted citations based on comparing at least one string in the textual document associated with the portion of the textual document to at least a subset of source documents of a plurality of source documents with a model selected from a plurality of models based on the at least one string, each predicted citation of the plurality of predicted citations corresponding to at least one source document of the plurality of source documents; displaying, on a graphical user interface, the plurality of predicted citations; and inserting, with at least one processor, a predicted citation of the plurality of predicted citations into the portion of the textual document based on a second user input associated with the plurality of predicted citations.

In non-limiting embodiments or aspects, the method further includes: receiving, from a user, a selection of the plurality of source documents. In non-limiting embodiments or aspects, wherein generating the plurality of predicted citations is further based on at least one of a machine-learning algorithm and a rule-based algorithm. In non-limiting embodiments or aspects, wherein generating the plurality of predicted citations comprises generating a predetermined number of predicted citations. In non-limiting embodiments or aspects, the method further includes: ranking the plurality of predicted citations based on at least one of relevance and semantic similarity of the at least one string preceding the portion of the textual document compared to at least a portion of at least one source document. In non-limiting embodiments or aspects, the first user input comprises selection of a button, and the portion of the textual document is a position of a cursor within the textual document. In non-limiting embodiments or aspects, the first user input comprises selection of the at least one string preceding the portion of the textual document.

In non-limiting embodiments or aspects, the method further includes: inserting, with at least one processor, a placeholder into the portion of the textual document based on the first user input, wherein inserting the predicted citation of the plurality of predicted citations into the portion of the textual document based on the second user input comprises replacing the placeholder with the predicted citation. In non-limiting embodiments or aspects, the graphical user interface comprises a plurality of citation cards corresponding to the plurality of predicted citations, each citation card of the plurality of citation cards comprising at least one selectable option, and the second user input comprises selection of the at least one selectable option. In non-limiting embodiments or aspects, the graphical user interface comprises: a first selectable option configured to, in response to being selected, cause a predicted citation corresponding to the first selectable option to be inserted into the textual document; and a second selectable option configured to, in response to being selected, cause a predicted citation corresponding to the second selectable option to be removed from the plurality of predicted citations.

In non-limiting embodiments or aspects, wherein generating the plurality of predicted citations comprises: for each source document of the plurality of source documents, automatically selecting a model from a plurality of models based on a format of the source document; and comparing the at least one string to each source document of the plurality of source documents with the model selected from the plurality of models for that source document. In non-limiting embodiments or aspects, the method further includes: displaying, on the graphical user interface, a plurality of strings within the textual document relating to a selected predicted citation of the plurality of predicted citations. In non-limiting embodiments or aspects, the method further includes: prompting a user to add a source document to the plurality of source documents. In non-limiting embodiments or aspects, the method further includes: associating the predicted citations and/or a pattern of the predicted citations to the source document.

According to non-limiting embodiments or aspects, provided is a system comprising at least one processor programmed or configured to: receive a first user input identifying a portion of a textual document; generate a plurality of predicted citations based on comparing at least one string in the textual document associated with the portion of the textual document to at least a subset of source documents of a plurality of source documents with a model selected from a plurality of models based on the at least one string, each predicted citation of the plurality of predicted citations corresponding to at least one source document of the plurality of source documents; display, on a graphical user interface, the plurality of predicted citations; and insert a predicted citation of the plurality of predicted citations into the portion of the textual document based on a second user input associated with the plurality of predicted citations.

In non-limiting embodiments or aspects, the at least one processor is further programmed or configured to: receive, from a user, a selection of the plurality of source documents. In non-limiting embodiments or aspects, wherein generating the plurality of predicted citations is further based on at least one of a machine-learning algorithm and a rule-based algorithm. In non-limiting embodiments or aspects, wherein generating the plurality of predicted citations comprises generating a predetermined number of predicted citations. In non-limiting embodiments or aspects, the at least one processor is further programmed or configured to: rank the plurality of predicted citations based on at least one of relevance and semantic similarity of the at least one string preceding the portion of the textual document compared to at least a portion of at least one source document. In non-limiting embodiments or aspects, the first user input comprises selection of a button, and the portion of the textual document is a position of a cursor within the textual document. In non-limiting embodiments or aspects, the first user input comprises selection of the at least one string preceding the portion of the textual document.

In non-limiting embodiments or aspects, the at least one processor is further programmed or configured to: insert a placeholder into the portion of the textual document based on the first user input, wherein inserting the predicted citation of the plurality of predicted citations into the portion of the textual document based on the second user input comprises replacing the placeholder with the predicted citation. In non-limiting embodiments or aspects, the graphical user interface comprises a plurality of citation cards corresponding to the plurality of predicted citations, each citation card of the plurality of citation cards comprising at least one selectable option, and the second user input comprises selection of the at least one selectable option. In non-limiting embodiments or aspects, the graphical user interface comprises: a first selectable option configured to, in response to being selected, cause a predicted citation corresponding to the first selectable option to be inserted into the textual document; and a second selectable option configured to, in response to being selected, remove a predicted citation corresponding to the second selectable option to be removed from the plurality of predicted citations.

In non-limiting embodiments or aspects, the at least one processor generates the plurality of predicted citations by: for each source document of the plurality of source documents, automatically selecting a model from a plurality of models based on a format of the source document; and comparing the at least one string to each source document of the plurality of source documents with the model selected from the plurality of models for that source document. In non-limiting embodiments or aspects, the at least one processor is further programmed or configured to: display, on the graphical user interface, a plurality of strings within the textual document relating to a selected predicted citation of the plurality of predicted citations. In non-limiting embodiments or aspects, the at least one processor is further programmed or configured to: prompt a user to add a source document to the plurality of source documents. In non-limiting embodiments or aspects, the at least one processor is further programmed or configured to: associate the predicted citations and/or a pattern of the predicted citations to the source document.

According to non-limiting embodiments or aspects, provided is a computer program product comprising at least one non-transitory computer-readable medium including program instructions that, when executed by at least one processor, cause the at least one processor to: receive a first user input identifying a portion of a textual document; generate a plurality of predicted citations based on comparing at least one string in the textual document associated with the portion of the textual document to at least a subset of source documents of a plurality of source documents with a model selected from a plurality of models based on the at least one string, each predicted citation of the plurality of predicted citations corresponding to at least one source document of the plurality of source documents; display, on a graphical user interface, the plurality of predicted citations; and insert a predicted citation of the plurality of predicted citations into the portion of the textual document based on a second user input associated with the plurality of predicted citations.

According to non-limiting embodiments or aspects, provided is a computer-implemented method comprising: receiving user input identifying a portion of a textual document; inserting a placeholder into the portion of the textual document based on the user input; generate a plurality of predicted citations based on at least one string preceding the placeholder, each predicted citation of the plurality of predicted citations corresponding to at least one source document of a plurality of source documents; display, on a graphical user interface, the plurality of predicted citations; and replacing the placeholder with a predicted citation of the plurality of predicted citations based on a user selection of the predicted citation from the plurality of predicted citations. In non-limiting embodiments or aspects, the method further includes: generating a table of facts based on predicted citations selected by the user, the table of facts ordered based on an ordering of the predicted citations on the textual document.

According to non-limiting embodiments or aspects, provided is a system comprising at least one processor programmed or configured to: receive user input identifying a portion of a textual document; insert a placeholder into the portion of the textual document based on the user input; generate a plurality of predicted citations based on at least one string preceding the placeholder, each predicted citation of the plurality of predicted citations corresponding to at least one source document of a plurality of source documents; display, on a graphical user interface, the plurality of predicted citations; and replace the placeholder with a predicted citation of the plurality of predicted citations based on a user selection of the predicted citation from the plurality of predicted citations. In non-limiting embodiments or aspects, the at least one processor is further programmed or configured to: generate a table of facts based on predicted citations selected by the user, the table of facts ordered based on an ordering of the predicted citations on the textual document.

According to non-limiting embodiments or aspects, provided is a computer program product comprising at least one non-transitory computer-readable medium including program instructions that, when executed by at least one processor, cause the at least one processor to receive user input identifying a portion of a textual document; insert a placeholder into the portion of the textual document based on the user input; generate a plurality of predicted citations based on at least one string preceding the placeholder, each predicted citation of the plurality of predicted citations corresponding to at least one source document of a plurality of source documents; display, on a graphical user interface, the plurality of predicted citations; and replace the placeholder with a predicted citation of the plurality of predicted citations based on a user selection of the predicted citation from the plurality of predicted citations. In non-limiting embodiments or aspects, the at least one processor is further programmed or configured to: generate a table of facts based on predicted citations selected by the user, the table of facts ordered based on an ordering of the predicted citations on the textual document.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION

Figure 1:
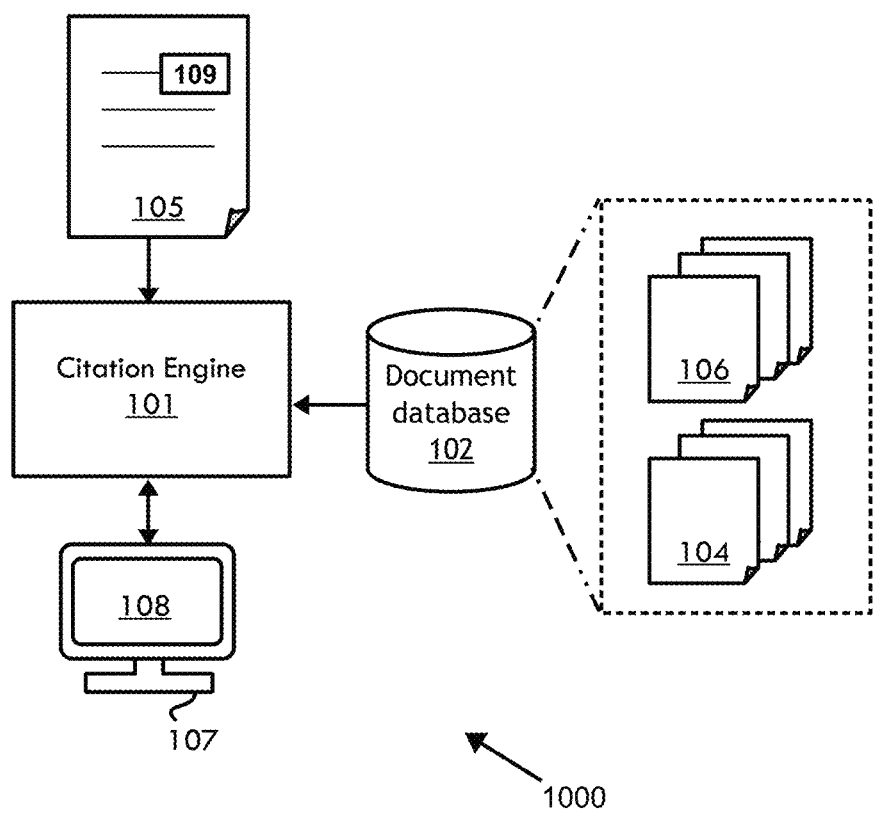
FIG. 1 illustrates a schematic diagram of a system for inserting citations into a textual document according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server, or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided herein are systems, methods, and computer program products for inserting citations into a textual document that improve upon existing word processing systems and/or document management systems. For example, systems and methods described herein may provide for a seamless experience for a user of a word processing system by facilitating the insertion of citations. Through the use of a placeholder, for example, non-limiting embodiments allow for multiple possible citations to be presented to the user before inserting the citation into the textual document, avoiding repetition and unnecessary use of computing resources to parse the entire document in a situation where the user has already determined where a citation should appear. Moreover, non-limiting embodiments provide for the use of different models to perform comparisons in a manner that optimizes the use of computing resources.

Referring now to FIG. 1, a system 1000 for inserting citations into a textual document 105 is shown according to non-limiting embodiments. The system 1000 includes a citation engine 101, which may include one or more computing devices and/or software applications executed by one or more computing devices. In non-limiting embodiments, the citation engine 101 may be executed by a client computing device 107. Additionally or alternatively, the citation engine 101 may be executed by one or more servers in communication with the client computing device 107. For example, the citation engine 101 may be one or more client-side applications, one or more server-side applications, or a combination of client-side and server-side applications. In some non-limiting embodiments, the citation engine 101 may be at least partially integrated with a word processing system, which may include a word processing application such as Microsoft® Word, Google® Documents, or the like. For example, the citation engine 101 may include an add-in (e.g., a plug-in, a module, a toolbar, and/or the like) for a word processing application that can be accessed from within the existing word processing application (e.g., through a menu, toolbar, sidebar, popup window, and/or the like). In some examples, the plug-in for the word processing application may interface with a server-side application (e.g., via an Application Programming Interface (API) or the like).

In non-limiting embodiments, the citation engine 101 is in communication with a document database 102 which may be local or remote to the citation engine 101. The document database 102 may include one or more databases arranged on one or more data storage devices in various locations. In non-limiting embodiments, the document database 102 includes legal documents 106, such as briefs, pleadings, and/or other writings, and factual documents 104, such as deposition transcripts, exhibits, and/or other evidentiary documents. It will be appreciated that various document databases may be in communication with the citation engine 101. For example, additional public and/or private document databases (not shown in FIG. 1) may include court databases, legal authority databases, information resources, and/or the like, and may be accessed via one or more APIs allowing the document database(s) to be queried over a network connection (e.g., over the Internet or a private network connection).

In non-limiting embodiments, the legal documents 106 and factual documents 104 may include source documents. As used herein, the term "source document" refers to a document that corresponds to a quotation or assertion within a legal document (e.g., a document that supports the quotation or assertion). Source documents may be factual documents 104, such as reports and transcripts, and may also be legal documents 106 such as pleadings. The source documents may be a subset of the documents in the document database 102, and may be obtained from a document management system, may be uploaded by the user via the client computer 107, and/or the like. In some examples, the source documents may be stored on the client computer 107 or a third-party system instead of or in addition to being stored in the document database 102. In non-limiting embodiments, a user may select the source documents that are associated with the textual document through a graphical user interface (GUI) 108. For example, before or during the drafting of the textual document 105, a user may identify a set of source documents that they intend to rely on by uploading them, selecting them from a stored location, and/or the like.

In non-limiting embodiments, the textual document 105 is viewed by a user (e.g., a document author or editor) through the GUI 108. For example, a user may utilize the GUI 108 to draft and/or edit the textual document 105 in a word processing application, and the textual document 105 may be stored locally on the client computing device 107 or on a server computer. The user may select an option on the GUI 108 and/or via a keyboard shortcut to insert a citation, in response to which the citation engine 101 automatically inserts a placeholder 109 into the textual document 105. As used herein, the term "placeholder" may refer to an indicator, such as a flag, icon, string, document object, and/or the like, that identifies a location in a textual document. A placeholder may have a visual representation in the textual document that identifies a location and/or may be represented as non-visible data within the textual document.

The user input may identify a portion of the textual document 105 for which a citation is needed. Identifying the portion of the textual document 105 may include highlighting or selecting one or more sentences, placing the text cursor in a specific position (e.g., following a sentence, in a footnote, and/or the like), or any other input that identifies a specific location for a citation or text that should be associated with a citation. In response to the user selecting an option to insert a citation, a placeholder 109 may be inserted into the textual document 105 at the location (e.g., at the specific location identified by the user or at a location following a portion of text identified by the user). For example, a user of the computing device 107 may insert a placeholder by pressing a button on the GUI 108 or a keyboard shortcut, in response to which a placeholder may be inserted where the cursor is currently positioned within the textual document. As another example, a user may select a sentence by highlighting it and then selecting a button, drop-down menu option, or the like to cause the placeholder to be inserted after the sentence. In some non-limiting embodiments, a placeholder may not be inserted into the textual document and, instead, a user may select an option (e.g., such as a button or the like) to provide suggested citations, in response to which suggested citations may be displayed for user viewing and/or selection based on highlighted text and/or a current position of the cursor without inserting a placeholder.

After inserting the placeholder 109 or after inserting a plurality of placeholders and selecting an option, the citation engine 101 may generate a plurality of predicted citations based on at least one string (e.g., a portion of the textual document, such as one or more sentences) preceding the placeholder and present, on the GUI 108, the plurality of predicted citations for user selection. In response to the user selecting a citation from the predicted citations, the citation engine 101 may replace the placeholder 109 with the selected citation. In examples in which multiple placeholders are inserted into the textual document 105, predicted citations may be generated for each placeholder as they are inserted or as a batch after the document is drafted or the user chooses a selectable option to process the placeholders.

In non-limiting embodiments, the citation engine 101 may generate the plurality of predicted citations based on one or more machine-learning algorithms and/or rule-based algorithms. In some non-limiting embodiments, for example, the citation engine 101 may automatically select an algorithm (e.g., model) from a plurality of potential algorithms based on the format of a particular source document. In this manner, different models may be used to compare the content of each source document to a portion of text (e.g., one or more strings) in the textual document. In some non-limiting embodiments, the citation engine 101 may generate a predetermined number of predicted citations (e.g., ten citations). In some non-limiting embodiments, the number of predicted citations presented may depend upon confidence scores for each predicted citation. For example, all predicted citations with a confidence score satisfying a threshold (e.g., meeting or exceeding a threshold value) may be displayed. In some non-limiting embodiments, the citation engine 101 may rank the plurality of predicted citations. For example, each predicted citation may be ranked based on a confidence score that results from the one or more algorithms used to generate the citation. The predicted citations may be presented to the user on the GUI 108 in an order of most confident to least confident.

In non-limiting embodiments, the confidence score of a predicted citation may be based on or include a semantic similarity between a string preceding the placeholder and at least a portion of a source document of the plurality of source documents 104. For example, a semantic similarity algorithm may compare one or more sentences preceding the placeholder 109 to the content of each source document 104 to determine a semantic similarity score that may be used as the confidence score or used to generate the confidence score used as a basis for ranking the plurality of predicted citations. The ranked predicted citations may be presented as a list. For example, the GUI 108 may visually display a plurality of citation cards where each citation card corresponds to a predicted citation. The term "citation card," as used herein, may refer to a visual representation of a predicted citation, and may include a box or other type of visible boundary to differentiate it from other citation cards. Each citation card may be presented as a separate predicted citation that includes one or more selectable options to, for example, accept or reject the predicted citation. Accepting a predicted citation may cause the citation to be inserted into the document in place of the placeholder. Rejecting the predicted citation may remove the predicted citation from the list and/or GUI 108. In non-limiting embodiments, the act of accepting and/or rejecting one or more predicted citations may be used as feedback to train one or more algorithms executed by the citation engine 101 to generate the predicted citations.

Figure 3A:
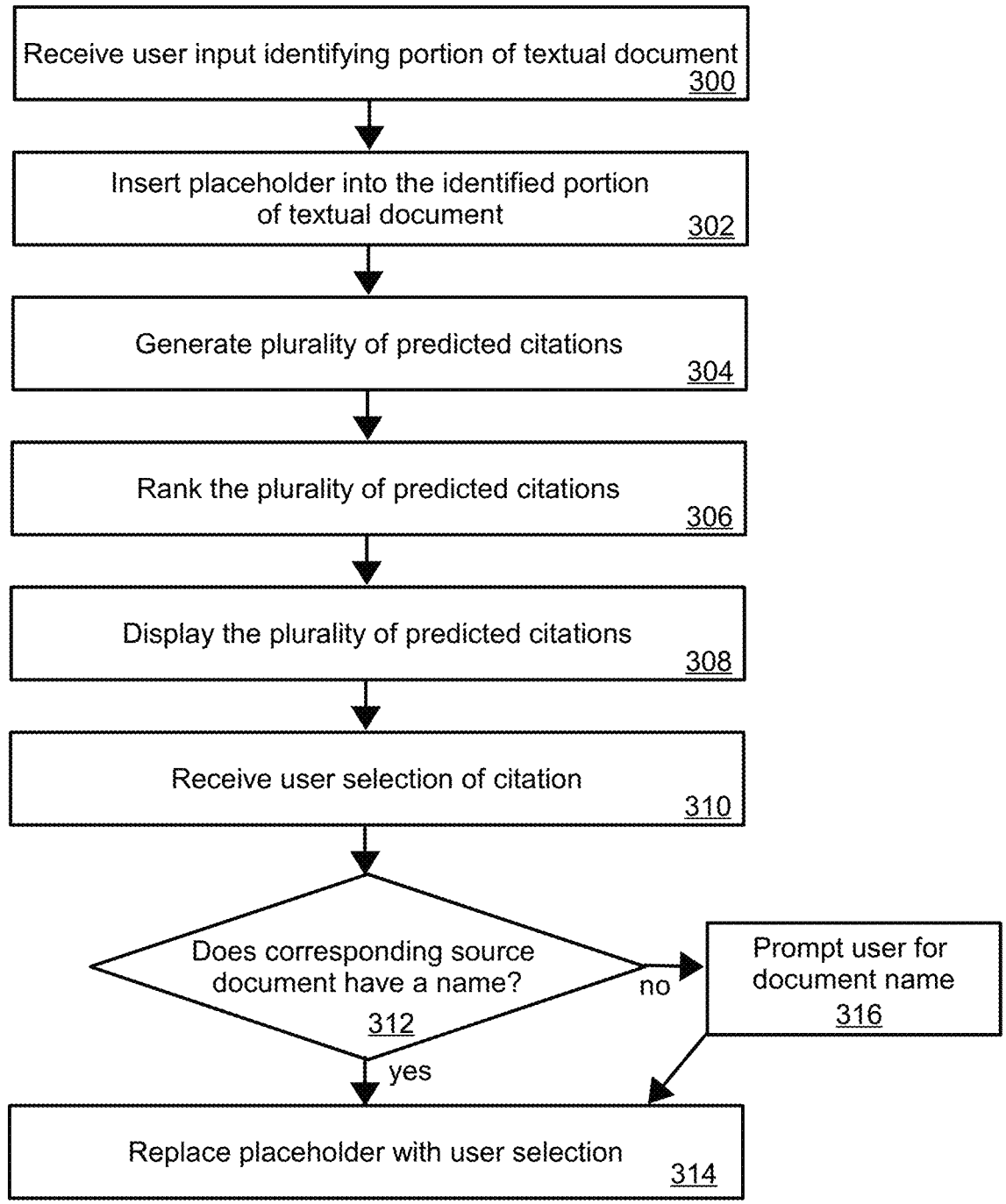
FIGS. 3A and 3B illustrate flow diagrams for a method for inserting citations into a textual document according to non-limiting embodiments or aspects.
Figure 3B:
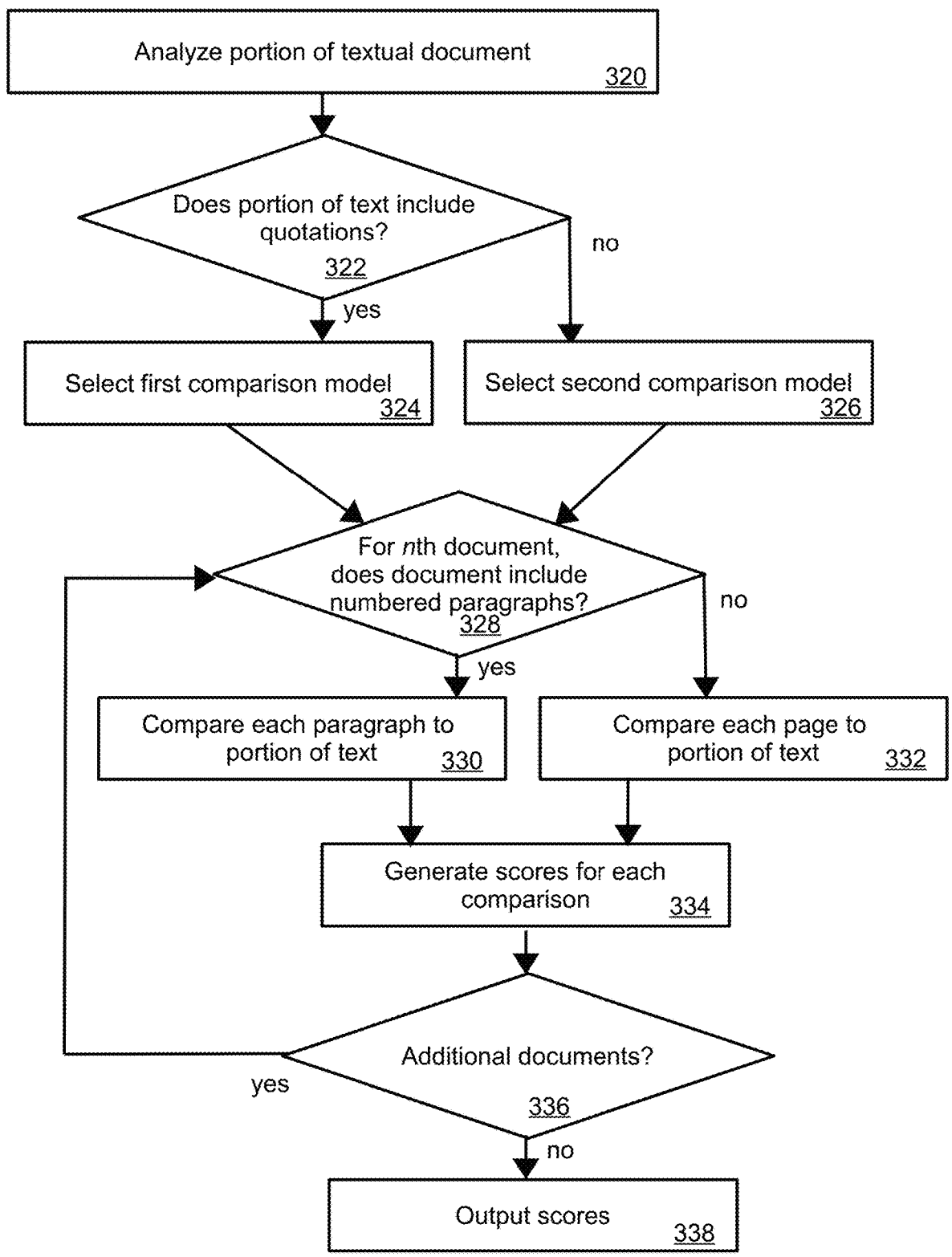

Referring now to FIGS. 3A and 3B, flow charts are shown for a method for inserting citations into a textual document according to non-limiting embodiments. The steps shown in FIGS. 3A and 3B are for example purposes only, and it will be appreciated that additional, fewer, different, and/or a different order of steps may be used in non-limiting embodiments. Referring to FIG. 3A, at a first step 300, user input is received that identifies a portion of a textual document. As an example, a user may select an "insert citation" button on a GUI or press a keyboard shortcut to identify the current location of the cursor in the textual document. As another example, a user may highlight a portion of text to identify a location within the document. At step 302, a placeholder is inserted into the textual document at the location identified in step 300. For example, in response to a user selecting an "insert citation" button or the like, a placeholder may be inserted into a particular location of the document (e.g., where the cursor is located or following a highlighted segment). In some examples, a placeholder may be inserted following a highlighted portion of the textual document and/or following a period of a sentence that has been at least partially selected.

At step 304, a plurality of predicted citations is generated. The plurality of predicted citations may be generated by one or more algorithms, such as a machine-learning algorithm and/or a rules-based algorithm. The one or more algorithms may identify one or more source documents that are determined to be the most relevant source documents (e.g., have a confidence score that satisfies a threshold). Each predicted citation may identify a source document that corresponds to the portion of text (e.g., one or more strings) preceding the placeholder. Each predicted citation may also identify, in some examples, a page number, a line number, a paragraph number, a docket number, and/or the like. The one or more algorithms used to generate the plurality of predicted citations may compare the content of one or more source documents with a portion of text preceding the placeholder (e.g., one or more strings corresponding to a sentence, paragraph, highlighted segment, and/or the like). For example, a semantic similarity algorithm may be used to compare each source document and/or portion of source document (e.g., page, line, and/or paragraph) to the portion of text.

Referring now to FIG. 3B, a flow chart is shown for a method of generating predicted citations according to non-limiting embodiments. In non-limiting embodiments, some or all of the steps shown in FIG. 3B may be performed as step 304 in FIG. 3A. At step 320, the portion of the textual document (identified in step 300 of FIG. 3A) is analyzed. For example, the portion of the textual document may be parsed. At step 322, as part of analyzing the portion of the textual document, it is determined if the portion of text includes quotations (e.g., strings within quotation marks and/or offset as block quotes). If the portion of text includes quotations, the method may proceed to step 324 in which a first comparison model (e.g., a first algorithm) is selected that is configured to compare literal or near-literal instances of text. As an example, a first comparison model may assign a low confidence score to a predicted citation if the quoted text does not appear in a source document corresponding to the predicted citation as-quoted in the textual document, and a higher confidence score if the quoted text does appear in a source document (e.g., a highest possible score if an exact match). If the portion of text does not include quotations, the method may proceed to step 326 in which a second comparison model (e.g., a second algorithm) is selected that is configured to compare non-literal instances of text (e.g., such as a semantic similarity algorithm). Selecting the first or second comparison model at steps 324 and 326 may involve identifying a particular software function from two or more software functions to be called for comparing two inputs. It will be appreciated that, in some non-limiting embodiments, any number of different models may be selected from based on various formats of source documents (e.g., paragraph numbers, line numbers, section numbers, and/or the like). Selecting between different comparison models results in computational efficiencies based on reducing the volume of data that is compared, thereby reducing the amount of computational resources needed to generate the results. For example, a first comparison model for literal or near-literal instances of text is less resource-intensive than a second comparison model that compares based on semantic similarity. In some examples, additional comparison models (e.g., a third model, a fourth model, etc.) may be used and selected from based on one or more parameters.

With continued reference to FIG. 3B, at steps 328-336, each source document of a plurality of source documents is iterated through. For example, at step 328, it is determined whether a first (or nth, where n is equal to the number of iterations) includes numbered paragraphs. If the source document includes numbered paragraphs, the method may proceed to step 330 in which the portion of text is compared to each paragraph by applying the comparison model selected at step 324 or 326. If the source document does not include numbered paragraphs, the method may proceed to step 332 in which the portion of text is compared to the content of each page by applying the comparison model selected at step 324 or 326. In some non-limiting embodiments, step 332 may also be performed before step 330 in response to determining, at step 328, that the document includes numbered paragraphs. In this manner, numerous comparisons of each paragraph across numerous pages may be avoided by first identifying a page that includes the quotation and then a paragraph in that page. In non-limiting embodiments, an additional step (not shown in FIG. 3B) may be performed to compare lines of a page or paragraph in instances in which the pages include line numbers. In some non-limiting embodiments, steps 330 and 332 may be performed concurrently.

Still referring to FIG. 3B, after steps 330 and/or 332 are performed for each paragraph and/or page, a confidence score is generated at step 334 for each individual comparison. For example, if step 330 was performed because the document included paragraph numbers, each paragraph of the document may be assigned a confidence score based on an output of the comparison model that is applied. In some embodiments, each page may also be assigned a confidence score based on an output of the comparison model. At step 336, it is determined if all source documents (e.g., all documents uploaded or identified by the user, a subset of documents uploaded or identified by the user that have been selected for the textual document, or the like) have been processed or if there are additional documents to process. If there are additional documents, the method may loop back to step 328 and the next (e.g., n+1) document is processed. If all documents have been processed, the method may proceed to step 338 and all of the scores generated at step 334 may be output. The output may be used as input to step 306 in FIG. 3A for ranking.

Referring back to FIG. 3A, after the plurality of predicted citations is generated, at step 306 the plurality of predicted citations may be ranked. For example, a confidence score output by the one or more algorithms used to generate each predicted citation may be used to rank the plurality of predicted citations. In some examples, a confidence score may include and/or be based on a semantic similarity score used by the one or more algorithms. At step 308, the plurality of predicted citations may be displayed on a GUI to be presented to the user. For example, a pane (e.g., a window or frame of a GUI) shown in connection with a word processing application may include a list of predicted citations. In some examples, each predicted citation may be presented as a citation card that includes a visual representation of a predicted citation with one or more selectable options for that predicted citation, such as options to accept or reject the predicted citation.

A user may select a citation from the list of predicted citations at step 310. For example, a user may click on the predicted citation, may select an option to accept the predicted citation, and/or the like. In some non-limiting embodiments, even when a predicted citation identifies a document for which the document name is known by the system, the user may still change how the document is named for each individual citation without changing any prior citations to that source document. In such an example, a sub-name may be associated with the source document such that multiple citation sub-names may be cited within the same source document. As an example, sub-names may be used for source documents that include several separate documents and may not have universal or consistent page numbering or Bates stamps.

At step 312, in response to the user selection of a predicted citation, it may be determined if the source document corresponding to the selected predicted citation is associated with a document name. For example, when uploading source documents in the GUI 400 shown in FIG. 4, a user may have input a document name. In some examples, the source document may include metadata identifying the document name. In some examples, the user may have previously input a document name with respect to a prior citation. If it is determined at step 312 that the source document corresponding to the selected predicted citation is associated with a document name, the method may proceed to step 314 in which the selected predicted citation may be inserted into the textual document to replace the placeholder. The document name may include an abbreviated document name (e.g., a shortened version for use in citations) and/or a citation format (e.g., a document name followed by an expected parameter, such as a page number, line number, paragraph number, and/or the like).

If it is determined at step 312 that the source document corresponding to the selected predicted citation is not associated with a document name, then the method may proceed to step 316 in which the user is prompted for a document name before the predicted citation is completed and used to replace the placeholder at step 314. For example, after selecting a predicted citation, the user may be asked "how do you refer to this source document?" with a prompt, in response to which the user may input "R. at 43" (e.g., citing the case record at page 43), "Tr. 48" (e.g., citing a transcript at page 48), or "Invest. Report at 126" (e.g., citing a report at page 126). The user's input identifies both the document name ("R.", "Tr.", "Invest. Report") and the citation format (e.g., the document name of "R." is followed by "at" and a page number). It will be appreciated that, in some non-limiting embodiments, step 312 and/or step 316 may be performed before and/or in conjunction with step 304 or before step 300 during document upload process. The document name and/or citation format may be saved in association with the source document (e.g., in memory of the citation engine) so that subsequent citations to the same document may use this information.

In non-limiting embodiments, in response to the prompt, the user input may identify a page number that may be used to determine the pagination format of the document. For example, the identified page number may be used to determine a page offset value for each source document. The offset value represents the number of pages preceding the content of the document (e.g., where the page numbers, such as document page numbers and/or Bates numbers, begin in the document) so that those pages can be skipped for determining citation page numbers and for comparing the portion of text to each page of the document. The offset value is determined by comparing the identified page to the actual page of the document (e.g., the page of the PDF). As an example, if a citation cites to the second page of a source document and the matching page is determined to be the tenth page of the source document (e.g., the tenth page of a PDF file or the like), the offset value is determined to be the difference between these values (e.g., 10−2=8).

Figure 4:
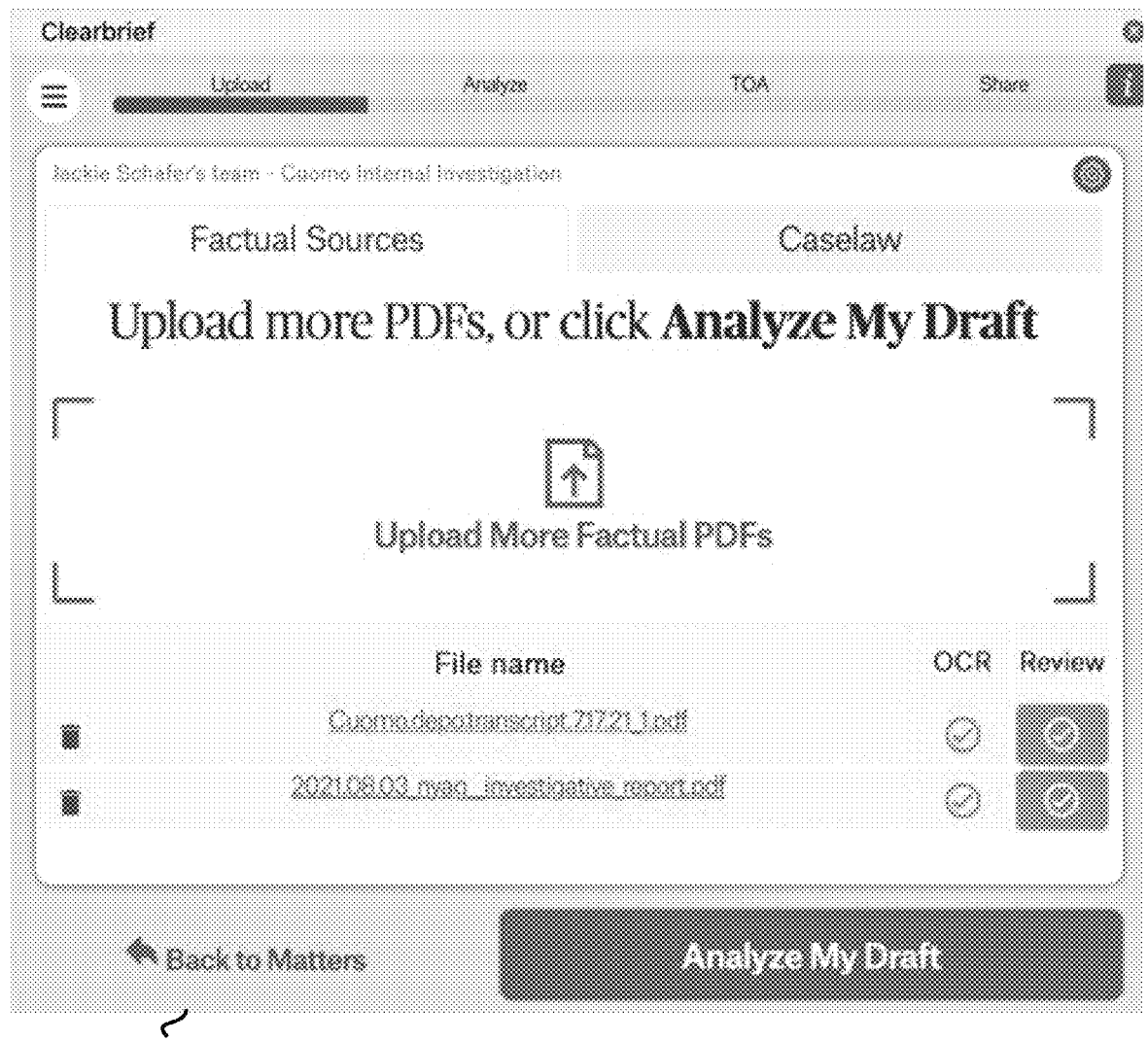
FIG. 4 illustrates a graphical user interface (GUI) used in connection with non-limiting embodiments or aspects of systems, methods, and computer program products for inserting citations into a textual document.

Referring now to FIG. 4, shown is a GUI 400 for uploading documents for use in a system and method of inserting citations into a textual document according to non-limiting embodiments. A user may utilize the GUI 400 to upload source documents for the factual citations that may be utilized. For example, a user may upload source documents through the GUI 400 before, during, or after drafting the content of the textual document by dragging and dropping files into the GUI 400. In some examples, a user may identify one or more folders (e.g., directories) that have already been uploaded to a database. In non-limiting embodiments, the system (e.g., a client-side and/or server-side application) may automatically index one or more databases of documents and/or files at a location identified by a user (e.g., an internal database of internal investigation summaries, case law, images, videos, and/or the like).

Figure 5:
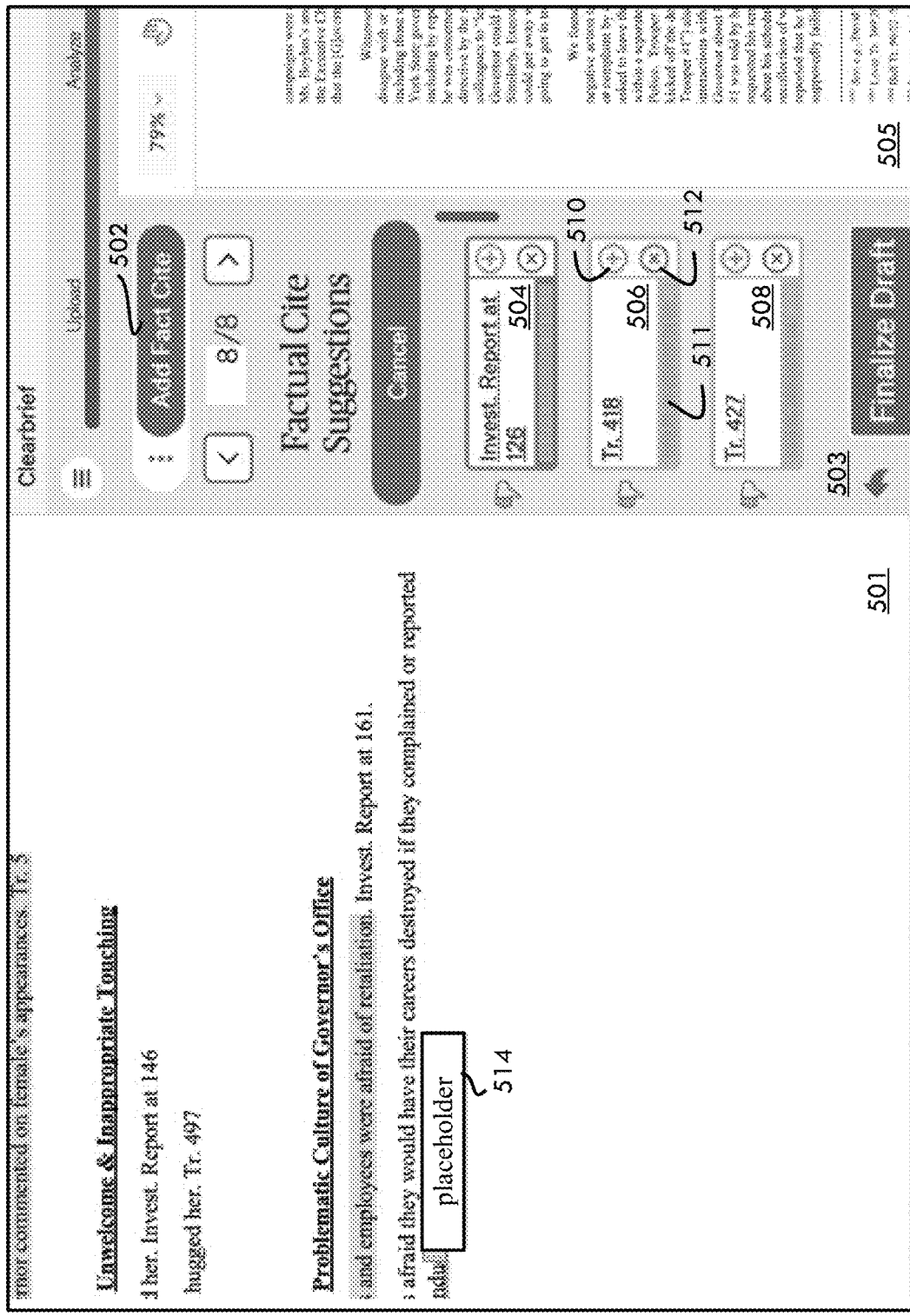
FIG. 5 illustrates a further GUI used in connection with non-limiting embodiments or aspects of systems, methods, and computer program products for inserting citations into a textual document.

Referring now to FIG. 5, shown is a GUI 500 for use in a system and method of inserting citations into a textual document according to non-limiting embodiments. The GUI 500 includes a word processing application pane 501 showing a placeholder 514 within a textual document. The GUI 500 also includes a citation insertion pane 503 that includes a citation insertion option 502 (e.g., "Add Fact Cite" button) and a plurality of predicted citations 504, 506, 508. Each predicted citation 504, 506, 508 may be displayed as a citation card including the predicted citation (e.g., "Invest. Report at 126", "Tr. 418", "Tr. 427"), a selectable option 510 to accept the predicted citation, a selectable option 512 to reject the predicted citation, and a confidence score indication 511 (shown as a series of colored blocks, as an example, although a percentile or other numerical score may be displayed in non-limiting embodiments). The citation insertion pane 503 may also include a source document preview pane 505 that shows the source document associated with a selected predicted citation. For example, by selecting predicted citations 504, 506, or 508, a source document corresponding to the selected predicted citation may be displayed in the source document preview pane 505. In some examples, the source document preview pane 505 may display the page of the document corresponding to the citation and may include highlighting or other forms of annotation to visually identify a particular line and/or paragraph.

With continued reference to FIG. 5, a user may be typing a document in the word processing application pane 501 and reach a point following an assertion where a citation should be added. The user may not know which source document to cite (e.g., a particular deposition transcript, expert report, or the like) and/or may not have the time or desire to manually enter a citation. The user selects the citation insertion option 502 (e.g., "Add Fact Cite" button) in the citation insertion pane 503. In some examples, the citation insertion option 502 may not be in a separate pane but may instead be displayed within the word processing application in the toolbar, as a drop-down menu option, and/or the like, and may also be non-visible such that it can be involved via a keyboard shortcut, gesture, and/or the like. In response to the user's input, a placeholder 514 may be inserted into the document. The placeholder may be inserted where the text cursor is, for example, or may be placed following highlighted text and/or a period after highlighted or identified text.

In response to the placeholder being inserted into the textual document, predicted citations 504, 506, 508 may be displayed in the citation insertion pane 503. In the example shown in FIG. 5, three predicted citations 504, 506, 508 are shown, although it will be appreciated that in non-limiting embodiments a predetermined number of predicted citations may be shown or a number of predicted citations may be shown that have a confidence score satisfying a threshold. The user may first select the first predicted citation 504, in response to which the source document preview pane 505 displays the corresponding source document (page 126 of the Investor's Report). The user may recognize from the preview that the citation is incorrect since it is meant to refer to a transcript instead. Thus, the user may select the second predicted citation 504, confirm that the transcript displayed in the source document preview pane 505 is correct, and select the selectable option 510 to accept the second predicted citation 506. The second predicted citation 506 may also be accepted by double-clicking it, right-clicking and choosing a menu option, and/or any other like action or gesture. In response to selection of the selectable option 510, the placeholder 514 may be replaced with the text "Tr. 418" (or "Invest. Report at 126" if the first predicted citation 504 is selected). In examples in which the placeholder 514 is a document object, replacing the placeholder 514 may include changing a parameter value of the document object.

In some non-limiting embodiments, the citation insertion pane 503 may include an option (e.g., from a drop-down menu or the like) as a filter to limit the source documents to subset of source documents. For example, a user may select all or a subset of source documents as the basis for providing predicted citations. Analyzing less than the entire corpus of source documents may result in more accurate suggestions, fewer suggestions, and/or faster processing, and results in an efficient use of computational resources by comparing fewer documents.

In non-limiting embodiments, a table of facts may be automatically generated based on the factual citations and the order of the factual citations throughout the textual document. For example, a selectable option (e.g., a button or menu option) may, when selected, cause a table of factual citations to be generated as a separate document or as an appendix to the textual document. In non-limiting embodiments, specific numbering may be added to the source documents for the purpose of identifying them as consecutive exhibits.

Figure 2:
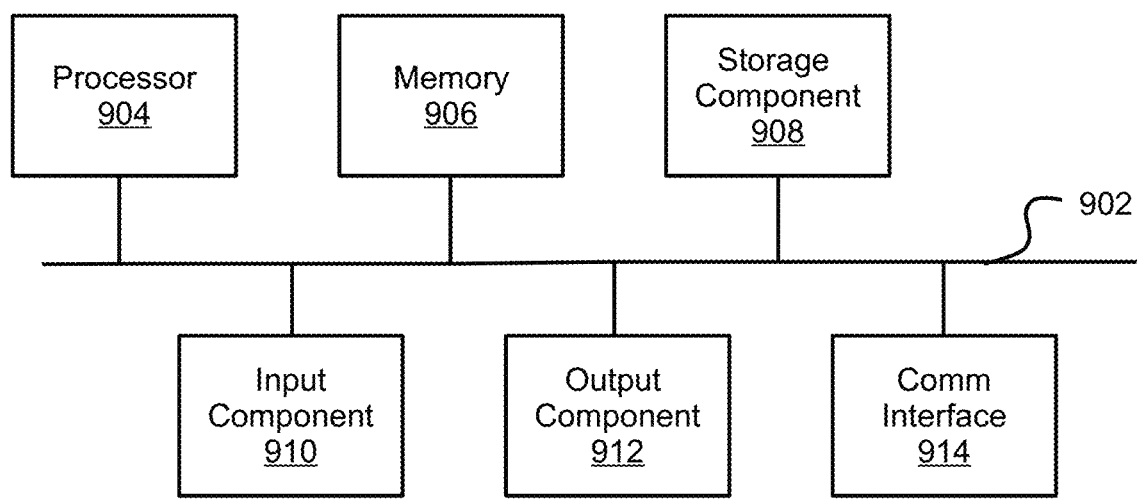
FIG. 2 illustrates example components of a device used in connection with non-limiting embodiments or aspects of systems, methods, and computer program products for inserting citations into a textual document.

Referring now to FIG. 2, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 2. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 2, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
   receiving, with at least one processor, a first user input identifying a portion of a textual document;
   selecting, with at least one processor, a model from a plurality of models based on at least one string in the textual document associated with the portion of the textual document identified by the first user input;
   generating, with at least one processor, a plurality of predicted citations based on comparing the at least one string to at least a subset of source documents of a plurality of source documents with the model, each predicted citation of the plurality of predicted citations corresponding to at least one source document of the plurality of source documents;
   displaying, on a graphical user interface, the plurality of predicted citations; and
   inserting, with at least one processor, a predicted citation of the plurality of predicted citations into the portion of the textual document based on a second user input associated with the plurality of predicted citations.

2. The computer-implemented method of claim 1, further comprising:
   receiving, from a user, a selection of the plurality of source documents.

3. The computer-implemented method of claim 1, wherein generating the plurality of predicted citations is further based on at least one of a machine-learning algorithm and a rule-based algorithm.

4. The computer-implemented method of claim 1, wherein generating the plurality of predicted citations comprises generating a predetermined number of predicted citations.

5. The computer-implemented method of claim 1, further comprising:
   ranking the plurality of predicted citations based on at least one of relevance and semantic similarity of the at least one string preceding the portion of the textual document compared to at least a portion of at least one source document.

6. The computer-implemented method of claim 1, wherein the first user input comprises selection of a button, and wherein the portion of the textual document is a position of a cursor within the textual document.

7. The computer-implemented method of claim 1, wherein the first user input comprises selection of the at least one string preceding the portion of the textual document.

8. The computer-implemented method of claim 1, further comprising:
   inserting, with at least one processor, a placeholder into the portion of the textual document based on the first user input, wherein inserting the predicted citation of the plurality of predicted citations into the portion of the textual document based on the second user input comprises replacing the placeholder with the predicted citation.

9. The computer-implemented method of claim 1, wherein the graphical user interface comprises a plurality of citation cards corresponding to the plurality of predicted citations, each citation card of the plurality of citation cards comprising at least one selectable option, and wherein the second user input comprises selection of the at least one selectable option.

10. The computer-implemented method of claim 1, wherein the graphical user interface comprises:
    a first selectable option configured to, in response to being selected, cause a predicted citation corresponding to the first selectable option to be inserted into the textual document; and
    a second selectable option configured to, in response to being selected, cause a predicted citation corresponding to the second selectable option to be removed from the plurality of predicted citations.

11. The computer-implemented method of claim 1, wherein generating the plurality of predicted citations comprises:
    for each source document of the plurality of source documents, automatically selecting a model from the plurality of models based on a format of the source document; and
    comparing the at least one string to each source document of the plurality of source documents with the model selected from the plurality of models for that source document.

12. The computer-implemented method of claim 1, further comprising:

displaying, on the graphical user interface, a plurality of strings within the textual document relating to a selected predicted citation of the plurality of predicted citations.

13. The computer-implemented method of claim 1, further comprising:
prompting a user to add a source document to the plurality of source documents.

14. The computer-implemented method of claim 13, further comprising:
associating the predicted citations and/or a pattern of the predicted citations to the source document.

15. A system comprising at least one processor programmed or configured to:
receive a first user input identifying a portion of a textual document;
select a model from a plurality of models based on at least one string in the textual document associated with the portion of the textual document identified by the first user input;
generate a plurality of predicted citations based on comparing the at least one string to at least a subset of source documents of a plurality of source documents with the model, each predicted citation of the plurality of predicted citations corresponding to at least one source document of the plurality of source documents;
display, on a graphical user interface, the plurality of predicted citations; and
insert a predicted citation of the plurality of predicted citations into the portion of the textual document based on a second user input associated with the plurality of predicted citations.

16. The system of claim 15, wherein the at least one processor is further programmed or configured to:
receive, from a user, a selection of the plurality of source documents.

17. The system of claim 15, wherein generating the plurality of predicted citations is further based on at least one of a machine-learning algorithm and a rule-based algorithm.

18. The system of claim 15, wherein generating the plurality of predicted citations comprises generating a predetermined number of predicted citations.

19. The system of claim 15, wherein the at least one processor is further programmed or configured to:
rank the plurality of predicted citations based on at least one of relevance and semantic similarity of the at least one string preceding the portion of the textual document compared to at least a portion of at least one source document.

20. The system of claim 15, wherein the first user input comprises selection of a button, and wherein the portion of the textual document is a position of a cursor within the textual document.

21. The system of claim 15, wherein the first user input comprises selection of the at least one string preceding the portion of the textual document.

22. The system of claim 15, wherein the at least one processor is further programmed or configured to:
insert a placeholder into the portion of the textual document based on the first user input, wherein inserting the predicted citation of the plurality of predicted citations into the portion of the textual document based on the second user input comprises replacing the placeholder with the predicted citation.

23. The system of claim 15, wherein the graphical user interface comprises a plurality of citation cards corresponding to the plurality of predicted citations, each citation card of the plurality of citation cards comprising at least one selectable option, and wherein the second user input comprises selection of the at least one selectable option.

24. The system of claim 15, wherein the graphical user interface comprises:
a first selectable option configured to, in response to being selected, cause a predicted citation corresponding to the first selectable option to be inserted into the textual document; and
a second selectable option configured to, in response to being selected, remove a predicted citation corresponding to the second selectable option to be removed from the plurality of predicted citations.

25. The system of claim 24, wherein the at least one processor generates the plurality of predicted citations by:
for each source document of the plurality of source documents, automatically selecting a model from the plurality of models based on a format of the source document; and
comparing the at least one string to each source document of the plurality of source documents with the model selected from the plurality of models for that source document.

26. The system of claim 15, wherein the at least one processor is further programmed or configured to:
display, on the graphical user interface, a plurality of strings within the textual document relating to a selected predicted citation of the plurality of predicted citations.

27. The system of claim 15, wherein the at least one processor is further programmed or configured to:
prompt a user to add a source document to the plurality of source documents.

28. The system of claim 27, wherein the at least one processor is further programmed or configured to:
associate the predicted citations and/or a pattern of the predicted citations to the source document.

29. A computer program product comprising at least one non-transitory computer-readable medium including program instructions that, when executed by at least one processor, cause the at least one processor to:
receive a first user input identifying a portion of a textual document;
select a model from a plurality of models based on at least one string in the textual document associated with the portion of the textual document identified by the first user input;
generate a plurality of predicted citations based on comparing the at least one string to at least a subset of source documents of a plurality of source documents with the model, each predicted citation of the plurality of predicted citations corresponding to at least one source document of the plurality of source documents;
display, on a graphical user interface, the plurality of predicted citations; and
insert a predicted citation of the plurality of predicted citations into the portion of the textual document based on a second user input associated with the plurality of predicted citations.

* * * * *